(12) United States Patent
Chen et al.

(10) Patent No.: US 8,058,744 B2
(45) Date of Patent: Nov. 15, 2011

(54) ELECTRICAL SYSTEM AND AUTOMOTIVE DRIVE SYSTEM HAVING AN ON-DEMAND BOOST CONVERTER, AND RELATED OPERATING METHODS

(75) Inventors: Keming Chen, Torrance, CA (US); Stephen Raiser, Wiesbaden (DE); George R. Woody, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 371 days.

(21) Appl. No.: 12/256,758

(22) Filed: Oct. 23, 2008

(65) Prior Publication Data

US 2010/0102635 A1  Apr. 29, 2010

(51) Int. Cl.
 *B60L 1/00* (2006.01)
(52) U.S. Cl. ..................................... 307/10.1
(58) Field of Classification Search .................. 307/10.1
See application file for complete search history.

(56) References Cited

U.S. PATENT DOCUMENTS

| 6,177,736 | B1 | 1/2001 | Raiser |
| 6,323,626 | B1 | 11/2001 | Raiser |
| 7,764,044 | B2 | 7/2010 | Ishikawa et al. |
| 7,830,108 | B2 | 11/2010 | Rumpf |
| 2010/0090525 | A1* | 4/2010 | King et al. ............ 307/10.1 |

FOREIGN PATENT DOCUMENTS

| CN | 2106102 U | 6/1992 |
| CN | 1989026 A | 6/2007 |
| CN | 1993879 A | 7/2007 |

OTHER PUBLICATIONS

Chinese Office Action dated Jul. 11, 2011 for Chinese Patent Application No. 200910207300.6.

* cited by examiner

*Primary Examiner* — Rexford Barnie
*Assistant Examiner* — Dru Parries
(74) *Attorney, Agent, or Firm* — Ingrassia Fisher & Lorenz P.C.

(57) ABSTRACT

Systems and methods are provided for an on-demand boost converter for use in a vehicle. An automotive drive system comprises a boost converter having an input node, a first output node associated with a first boost leg, and a second output node associated with a second boost leg. A fuel cell is coupled to the input node of the boost converter and a battery is coupled to the first output node. An inverter module is coupled to the second output node, and a vehicle traction drive unit is coupled the inverter module. A first switch is coupled between the second output node and the first output node, wherein the battery provides energy to the second output node when the first switch is closed.

18 Claims, 1 Drawing Sheet

ELECTRICAL SYSTEM AND AUTOMOTIVE DRIVE SYSTEM HAVING AN ON-DEMAND BOOST CONVERTER, AND RELATED OPERATING METHODS

TECHNICAL FIELD

Embodiments of the subject matter described herein relate generally to electrical systems, such as electric and hybrid vehicle drive systems. More particularly, embodiments of the subject matter relate to a multiphase boost converter configured to drive a power inverter module for a vehicle.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Many electric-powered vehicles require a high primary operating voltage, e.g., 400 volts DC. Typical fuel cells provide less than one volt DC under load. Therefore, a large number of individual fuel cells are often configured or "stacked" in series to provide a fuel cell stack capable of providing the high primary operating voltage required by the vehicle. Additionally, most fuel cell vehicles and/or systems are designed to provide all of the traction power for vehicle operation from the fuel cell stack. This results in overdesign of the fuel cell stack because it must provide the peak power needed for the vehicle. Often, sufficient stacking of fuel cells is not practical in many high-voltage applications due to cost and packaging constraints.

Power converters, such as direct current-to-direct current (DC/DC) boost converters, are typically used to raise the voltage level of a fuel cell stack and reduce the number of individual fuel cells needed in the vehicle. Often, a high-voltage battery is utilized to provide the peak power to the vehicle during periods of operation requiring traction power in excess of what the fuel cell stack can provide. The high-voltage battery may be recharged by the fuel cell stack when the vehicle traction drive unit does not require peak power. However, the high-voltage battery limits the voltage range at the converter output, and therefore these designs are inefficient during light loading conditions where vehicle does not require such high voltage.

BRIEF SUMMARY

An apparatus is provided for an electrical system for use in a vehicle. The electrical system comprises a boost converter coupled to a reference node. The boost converter has an input node, a first output node associated with a first leg, and a second output node associated with a second leg. A first energy source is coupled between the input node and the reference node and a second energy source coupled between the first output node and the reference node. The second energy source has a voltage greater than the voltage of the first energy source. A first switch is coupled between the second output node and the first output node, wherein the second energy source provides energy to the second output node when the first switch is closed.

In another embodiment, an apparatus is provided for an automotive drive system. The automotive drive system comprises a boost converter having an input node, a first output node associated with a first boost leg, and a second output node associated with a second boost leg. A fuel cell is coupled to the input node of the boost converter and a battery is coupled to the first output node. An inverter module is coupled to the second output node, and a vehicle traction drive unit is coupled to the inverter module. A first switch is coupled between the second output node and the first output node, wherein the battery provides energy to the second output node when the first switch is closed.

A method is provided for controlling a boost converter. The boost converter has a first output node associated with a first boost leg, and a second output node associated with a second boost leg. The method comprises activating the first boost leg and deactivating the second boost leg to support operation in a first loading mode, and activating both the first boost leg and the second boost leg to support operation in a second loading mode.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following FIGURE.

DETAILED DESCRIPTION

Figure 1:
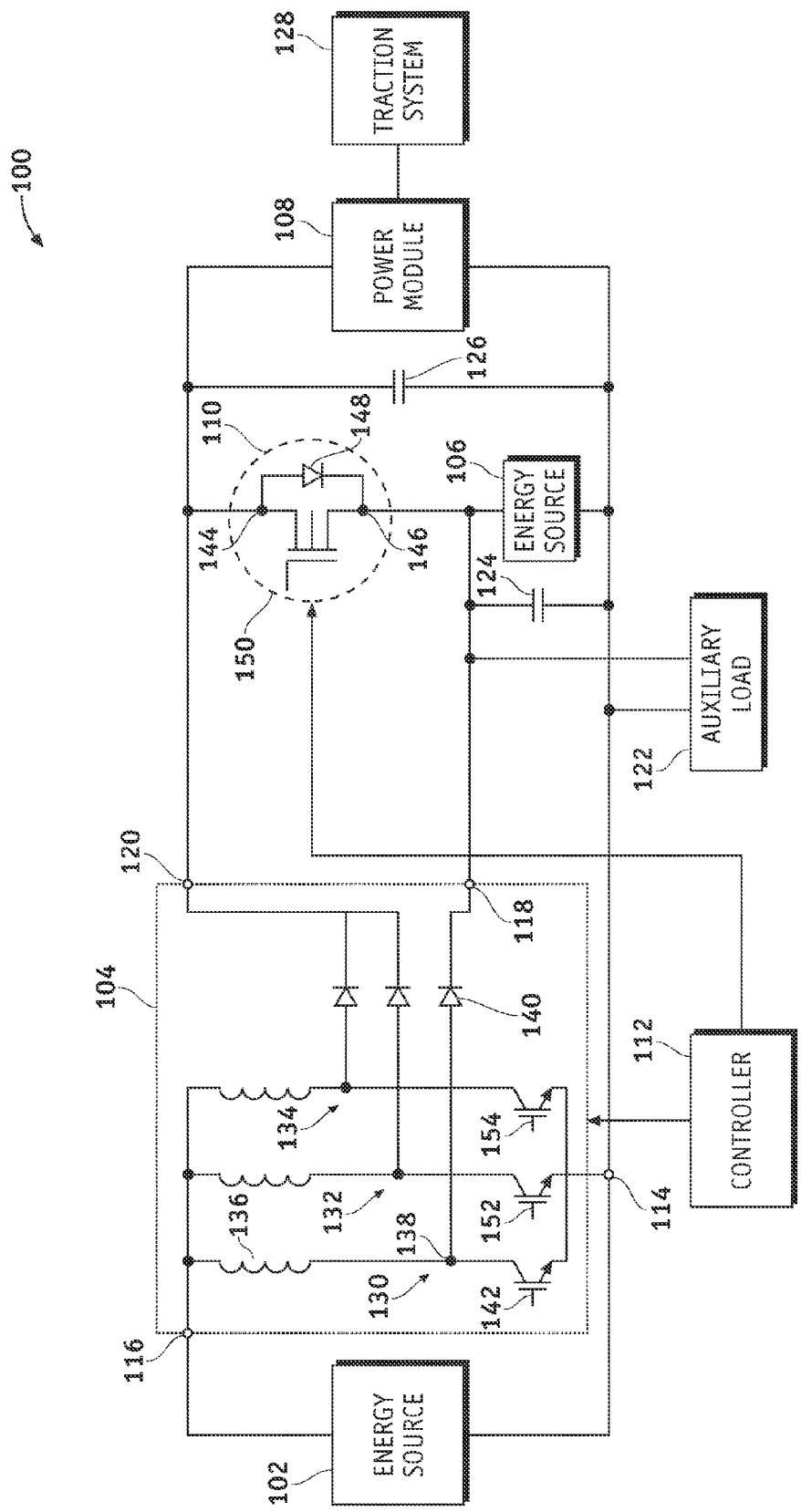
FIG. 1 is a schematic view of an electrical system suitable for use in a vehicle in accordance with one embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

In addition, certain terminology may also be used in the following description for the purpose of reference only, and thus are not intended to be limiting. For example, the terms "first", "second" and other such numerical terms referring to structures do not imply a sequence or order unless clearly indicated by the context.

For the sake of brevity, conventional techniques related to signaling, transistor-based switch control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and/or concepts described herein relate generally to electrical systems with multiphase boost converters which are utilized in automotive drive systems. The outputs of the respective phase legs (or boost legs) may be coupled via a switch to enable varying the voltage at each output as desired in order to improve efficiency of the boost converter and an inverter module driven by the boost converter by reducing switching losses in the respective devices.

Referring to FIG. 1, in an exemplary embodiment, an electrical system 100 suitable for use as part of an automotive drive system in a vehicle includes, without limitation, a first energy source 102, a boost converter 104, a second energy source 106, a power module 108, and a switch 110. A controller 112 may be coupled to the boost converter 104 and the switch 110, and the controller 112 is suitably configured to support operation of the electrical system 100, as described in greater detail below. In an exemplary embodiment, the electrical system 100 is configured to reduce switching losses and maximize the efficiency of the boost converter 104 and the power module 108, as described in greater detail below. It should be understood that FIG. 1 is a simplified representation of an electrical system 100 and is not intended to limit the subject matter in any way.

In an exemplary embodiment, the boost converter 104 is coupled to a reference node 114 for the electrical system 100. An input node 116 of the boost converter 104 is coupled to the first energy source 102, which in turn is also coupled to the reference node 114. More specifically, the input node 116 corresponds to the positive terminal of the first energy source 102, and the reference node 114 corresponds to the negative terminal of the first energy source 102. In an exemplary embodiment, the boost converter 104 is a multiphase DC to DC converter having a plurality of output nodes 118, 120. In an exemplary embodiment, the second energy source 106 is coupled between a first output node 118 of the boost converter 104 and the reference node 114. More specifically, the first output node 118 corresponds to the positive terminal of the second energy source 106, and the reference node 114 corresponds to the negative terminal of the second energy source 106. In one or more embodiments, an auxiliary load 122 may be coupled between the first output node 118 of the boost converter 104 and the reference node 114, as described in greater detail below. An auxiliary capacitor 124 may be coupled between the first output node 118 and the reference node 114 to reduce output voltage ripple and smooth the voltage between the boost converter 104 and the second energy source 106, as will be appreciated in the art. The power module 108 is coupled between the second output node 120 of the boost converter 104 and the reference node 114. A second capacitor 126 may be coupled between the second output node 120 and the reference node 114 to reduce output voltage ripple and smooth the voltage between the boost converter 104 and the power module 108. In accordance with one embodiment, a vehicle traction drive unit 128 is coupled to the output of the power module 108.

As shown in FIG. 1, in an exemplary embodiment, the switch 110 is coupled between the first output node 118 and the second output node 120. As described in greater detail below, the switch 110 is operated under control of the controller 112 during operation of the electrical system 100 to reduce switching losses and improve the efficiency of the electrical system 100 under various loading conditions. For example, under heavy loading conditions that require power at the second output node 120 in excess of what the first energy source 102 is capable of providing, the controller 112 may activate (or close) the switch 110 to couple the output nodes 118, 120 (or alternatively, couple the second energy source 106 to the power module 108) to provide peak power to the second output node 120 from the second energy source 106 during heavy loading conditions. In other situations, the controller 112 may deactivate (or open) the switch 110 to reduce the voltage at the second output node 120 and thereby reduce switching losses in the power module 108 and increase the efficiency of the power system 100 as described below.

Depending on the embodiment, the energy sources 102, 106 may each be realized as a battery, a fuel cell (or fuel cell stack), one or more capacitors (e.g., an ultracapacitor or capacitor bank), or another suitable voltage source. For the implementation described here, the second energy source 106 has a voltage greater than or equal to the first energy source 102. In an exemplary embodiment, the first energy source 102 is realized as a fuel cell stack and the second energy source 106 is realized as a high-voltage battery. In this regard, the fuel cell stack typically includes approximately 300 individual fuel cells, each of which provides approximately 0.6 volts DC under full load. The high-voltage battery has a voltage ranging from 300 volts DC to 400 volts DC, and potentially even higher, with a typical nominal voltage of approximately 360 volts DC. It will be appreciated in the art that the actual voltage of the battery will vary over time depending on, among other variables, the state of charge of the battery and the characteristics of the auxiliary capacitor 124.

In an exemplary embodiment, the boost converter 104 is a multiphase DC to DC converter having a plurality of boost legs 130, 132, 134. FIG. 1 depicts a boost converter 104 having three boost legs 130, 132, 134, however, in practice, the boost converter 104 may include additional or fewer boost legs depending on the needs of the particular application. Furthermore, the boost converter 104 may include additional output nodes associated with additional boost legs as desired. As used herein, a boost leg 130, 132, 134 should be understood as collectively referring to a configuration of devices or circuit elements capable of operating independently as a single-phase step-up (or boost) converter. For example, as shown in FIG. 1, a first boost leg 130 includes an inductor 136 coupled between the input node 116 of the boost converter 104 and a node 138. A diode 140 is coupled between the node 138 and the first output node 118, and a boost switch 142 is coupled between the node 138 and reference node 114. In an exemplary embodiment, the boost switch 142 is realized as a semiconductor device, preferably, an insulated-gate bipolar transistor (IGBT). The boost switch 142 may be modulated (opened and closed) at a variable duty cycle which varies the current through the inductor 136, and thereby determines the voltage at the first output node 118. In this configuration, the first boost leg 130 resembles a conventional single-phase boost converter, as will be appreciated in the art. In an exemplary embodiment, additional boost legs 132, 134 are similarly configured between the input node 116 and the second output node 120 of the boost converter 104.

Although FIG. 1 depicts the second and third boost legs 132, 134 being coupled together at second output node 120, in some embodiments, the third boost leg 134 may be associated with a third output node separate from the other output nodes 118, 120. Additionally, in alternative embodiments, node 120 may be coupled to the output of more than one boost leg. Furthermore, one or more of the boost legs 130, 132, 134 could be realized as a bi-directional implementation. For example, although not illustrated, boost leg 130 may be implemented by adding another switch electrically in parallel with the diode 140 and adding another diode in parallel with the switch 142. This bi-directional implementation would allow the energy source 106 and/or node 116 to be charged to a high-voltage from node 118, as will be appreciated in the art.

In an exemplary embodiment, the power module 108 is realized as a power inverter configured to convert direct current from the output node 120 into alternating current. In this regard, although not illustrated, the inverter power module 108 includes a series of switches (typically semiconductor devices such as insulated-gate bipolar transistors or IGBTs) and freewheeling diodes which are modulated under control of a microprocessor (or controller) to provide a desired AC voltage and/or current at an output of the power module 108. The vehicle traction drive unit 128 may include a motor which operates in a manner that is influenced by the AC power provided at the output of the power module 108. In some embodiments, the vehicle traction drive unit 128 may include regenerative braking systems or other means for converting kinetic energy to electrical energy for provision to the electrical system 100 via power module 108, as described in greater detail below.

In an exemplary embodiment, the switch 110 is realized as a semiconductor device. In accordance with one embodiment, the switch 110 is realized as a metal-oxide-semiconductor field-effect transistor (MOSFET). FIG. 1 illustrates an exemplary configuration of the switch 110 for an N-channel MOSFET. For clarity and ease of explanation, the subject matter will be described herein in terms of an N-channel configuration, however, it will be appreciated in the art that the subject matter may also be implemented using P-channel devices. As shown in FIG. 1, in an exemplary embodiment, a source terminal 144 of the switch 110 is coupled to the second output node 120 and a drain terminal 146 of the switch 110 is coupled to the first output node 118. In such a configuration, when a MOSFET is used, a parasitic body diode 148 exists within the MOSFET device having the polarity shown. A gate terminal 150 of the switch 110 may be used to control the functionality of the switch 110 in a known manner. In accordance with one embodiment, the gate terminal 150 is coupled to the controller 112 and is responsive to control signals from the controller 112 as described below.

In an exemplary embodiment, the controller 112 is configured to operate the boost legs 130, 132, 134 and the switch 110 in response to various loading conditions at the second output node 120 for optimum efficiency of the electrical system 100. Although not illustrated, the controller 112 is configured to vary the respective duty cycles of the boost switches 142, 152, 154 to control the voltages at the output nodes 118, 120, as will be appreciated in the art. In an exemplary embodiment, the controller 112 controls the first boost switch 142 to provide a voltage at the first output node 118 substantially equal to the voltage of the second energy source 106. In this regard, the controller 112 may monitor the voltage and/or state of charge of the second energy source 106 and adjust the duty cycle of the first boost switch 142 accordingly to produce the necessary voltage at the first output node 118. The second energy source 106 may be continually charged by the first energy source 102 during operation of the electrical system 100 as long as the switch 110 is not activated (i.e., open).

In an exemplary embodiment, the controller 112 is configured to determine the level of loading at the second output node 120 and activate the second and third boost legs 132, 134 based on the load condition. Although not illustrated, the controller 112 may communicate with the power module 108, vehicle traction drive unit 128, or another electronic control unit (ECU) within the vehicle to determine the desired level of voltage and/or current at the second output node 120. In general, the desired level of voltage and/or current at the second output node 120 is based on the loading of the traction drive unit 128 during operation of the vehicle. For example, in some situations, when the loading of the traction drive unit 128 is relatively light, the power module 108 and/or traction drive unit 128 may only require a voltage less than or equal to the voltage of the first energy source 102. In this situation, when the load at the second output node 120 is relatively light, the controller 112 will deactivate the boost legs 132, 134 associated with the second output node 120 by opening the respective boost switches 152, 154 to achieve operation in a light loading mode. That is, the duty cycle associated with boost switches 152, 154 is zero. When the boost switches 152, 154 are not activated (i.e., open), the power losses associated with switching the boost switches 152, 154 are reduced. In an exemplary case, the efficiency of the boost converter 104 can be improved by about one percent by deactivating boost legs 132, 134 during light load. The stress on the other components (i.e., the diodes and inductors) in the boost legs 132, 134 is also reduced. In an exemplary embodiment, the controller 112 is also configured to deactivate or open the switch 110 in response to determining a light loading condition at the second output node 120. By deactivating the boost legs 132, 134 and switch 110, the voltage across the switches in the inverter power module 108 (i.e., the voltage between the output node 120 and the reference node 114) is decreased, thereby reducing the switching losses in the power module 108. In the exemplary case discussed above, the efficiency of the power module 108 can be improved by about 0.6% at light load, resulting in an overall efficiency gain of approximately 1.6% for the electrical system 100.

As the level of loading increases at the second output node 120 the controller 112 activates the second and third boost legs 132, 134 while maintaining the switch 110 in an open state to support operation in periods of intermediate loading. For example, the controller 112 may determine that the power module 108 and/or vehicle traction drive unit 128 desires a voltage at the second output node 120 that exceeds the voltage of the first energy source 102. In response, the controller 112 may vary the duty cycles of boost switches 152, 154 as needed to produce a desired voltage at the second output node 120 for operating the vehicle traction drive unit 128 at a higher voltage. In this manner, the electrical system 100 may be referred to as providing "on-demand" boost for the vehicle traction drive unit 128.

In an exemplary embodiment, the controller 112 is configured to activate or close the switch 110 to achieve a desired power flow between the second energy source 106 and the power module 108. In response to determining a peak loading condition exists at the vehicle traction drive unit 128, the controller 112 may activate (i.e., close) the switch 110 to provide power from the second energy source 106 to the power module 108 to support operation of the vehicle traction drive unit 128 in a peak loading mode. For the N-channel MOSFET implementation, the controller 112 may be configured to provide a control signal or positive voltage to the gate terminal 150 to create a conductive channel in the switch 110, as will be appreciated in the art. In some embodiments, the controller 112 may be configured to limit the duty cycles of the boost switches 152, 154 such that the voltage at the second output node 120 does not substantially exceed the voltage at the first output node 118 in order to prevent a potentially damaging inrush current when the switch 110 is closed. In an exemplary embodiment, when the peak power from the second energy source 106 is no longer desired or required, the controller 112 may be configured to deactivate (or open) the switch 110. Such a condition may occur, for example, when the traction drive unit 128 is under light or intermediate loading.

In accordance with one embodiment, the controller 112 is configured to determine if a regenerative event is occurring, and activate (or close) the switch 110 to provide power from the power module 108 to the second energy source 106. For example, the traction drive unit 128 may include a regenerative braking system or another system capable of converting kinetic energy into electrical energy. This electrical energy may be used to recharge the second energy source 106 using the power module 108 and/or traction drive unit 128 when the switch 110 is activated or closed. When the switch 110 is realized as an N-channel MOSFET configured as shown in FIG. 1, the parasitic diode 148 will automatically allow electrical energy to flow to the second energy source 106 when voltage at the second output node 120 exceeds the voltage at the first output node 118 by a certain amount based on the MOSFET device characteristics. In this regard, the second energy source 106 may be recharged by the power module 108 and/or traction drive unit 128 without any input at gate terminal 150 or action on behalf of the controller 112. However, in an exemplary embodiment, the switch 110 is activated (i.e., closed) to reduce losses in the switch 110 and prevent any potential damage to the switch 110 or other components.

In various alternative embodiments, one or more auxiliary loads 122 may be coupled between the first output node 118 and the reference node 114. For example, in a fuel cell vehicle, the auxiliary load 122 may comprise an air compressor for providing oxygen to the fuel cell stack. In other embodiments, the auxiliary load 122 may comprise another type of compressor (e.g., a turbocompressor or a system compressor), another power module (e.g., a DC to DC converter or an inverter), or another load suitable for operation at the voltage level of the second energy source 106. It will be appreciated in the art that such a configuration allows the auxiliary load 122 to be operated from a higher voltage and thus at a lower current, which may provide an efficiency advantage or allow for a lower cost implementation for some loads. Although not described in detail herein, various combinations and configurations of auxiliary nodes are possible to achieve desired performance objectives, as will be appreciated in the art.

One advantage of the systems and/or methods described above is that the efficiency of the electrical system may be improved by reducing switching losses in the boost converter and the inverter power module. During periods of light loading, one boost leg may operate to provide charging power to a high-voltage battery for peak power, while the other boost legs are inactive. The high-voltage battery may be selectively coupled to the inverter power module by use of a switch. Depending on the conditions, the high-voltage battery may provide peak power to the vehicle traction drive unit or absorb regenerative energy from the traction drive unit.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An electrical system for use in a vehicle, the electrical system comprising:
a reference node;
a boost converter coupled to the reference node, the boost converter having an input node, a first output node associated with a first leg, and a second output node associated with a second leg;
a first energy source coupled between the input node and the reference node, the first energy source having a first voltage;
a second energy source coupled between the first output node and the reference node, the second energy source having a second voltage, wherein the second voltage is greater than the first voltage; and
a first switch coupled between the second output node and the first output node, wherein the second energy source provides energy to the second output node when the first switch is closed.

2. The electrical system of claim 1, wherein the first energy source is a fuel cell.

3. The electrical system of claim 1, further comprising a power module coupled between the second output node and the reference node.

4. The electrical system of claim 3, further comprising a traction drive unit coupled to the power module.

5. The electrical system of claim 3, the second leg having a second boost switch coupled between the second output node and the reference node, wherein the electrical system further comprises a controller coupled to the boost converter, the controller being configured to:
activate the second boost switch at a second duty cycle to produce a desired voltage at the second output node, if the desired voltage is greater than the voltage of the first energy source; and
deactivate the second boost switch if the desired voltage is less than the voltage of the first energy source.

6. The electrical system of claim 5, the controller being coupled to the first switch, wherein the controller is configured to activate the first switch to achieve a desired power flow between the second energy source and the power module.

7. The electrical system of claim 5, the first leg having a first boost switch coupled between the first output node and the reference node, wherein the controller is configured to activate the first boost switch at a first duty cycle to achieve the second voltage at the first output node.

8. The electrical system of claim 1, further comprising an auxiliary load coupled between the first output node and the reference node.

9. The electrical system of claim 1, wherein the first switch comprises a metal-oxide-semiconductor field-effect transistor.

10. The electrical system of claim 1, wherein the second energy source comprises a capacitor.

11. The electrical system of claim 1, wherein the second energy source comprises a battery.

12. The electrical system of claim 11, wherein the battery has a nominal DC voltage between about 300 volts and about 400 volts.

13. The electrical system of claim 11, further comprising an auxiliary capacitor coupled between the first output node and the reference node.

14. An automotive drive system comprising:
- a boost converter having an input node, a first output node associated with a first boost leg, and a second output node associated with a second boost leg;
- a fuel cell coupled to the input node;
- a battery coupled to the first output node;
- an inverter module coupled to the second output node;
- a vehicle traction drive unit coupled to the inverter module;
- a first switch coupled between the second output node and the first output node, wherein the battery provides energy to the second output node when the first switch is closed; and
- a controller coupled to the boost converter, the controller being configured to:
  - activate the second boost leg if a desired voltage at the second output node is greater than a voltage of the fuel cell; and
  - deactivate the second boost leg if the desired voltage is less than the voltage of the fuel cell.

15. The automotive drive system of claim 14, the controller being coupled to the first switch, wherein the controller is configured to activate the first switch to achieve a desired power flow between the battery and the vehicle traction drive unit.

16. The automotive drive system of claim 15, wherein the controller is configured to activate the first boost leg to achieve a desired voltage at the first output node.

17. A method for controlling a boost converter having a first output node associated with a first boost leg, and a second output node associated with a second boost leg, wherein the first output node is coupled to an energy source, the method comprising:
- activating the first boost leg and deactivating the second boost leg to support operation in a first loading mode;
- activating both the first boost leg and the second boost leg to support operation in a second loading mode; and
- activating a switch coupled between the first output node and the second output node to support operation in a third loading mode.

18. The method of claim 17, the second output node being coupled to a vehicle traction drive unit, wherein the method comprises:
- activating the first boost leg and deactivating the second boost leg to support operation of the vehicle traction drive unit in the first loading mode, the first loading mode corresponding to relatively light loading of the vehicle traction drive unit;
- activating both the first boost leg and the second boost leg to support operation of the vehicle traction drive unit in the second loading mode, the second loading mode corresponding to relatively high loading of the vehicle traction drive unit; and
- activating the switch coupled between the first output node and the second output node to support operation of the vehicle traction drive unit in the third loading mode, the third loading mode corresponding to peak loading of the vehicle fraction drive unit.

* * * * *